Patented June 8, 1943

2,321,301

UNITED STATES PATENT OFFICE 2,321,301

COMPOSITION OF MATTER

Joy G. Lichty, Stow, Ohio, assignor to Wingfoot Corporation, Akron, Ohio, a corporation of Delaware No Drawing. Application May 31, 1940,
Serial No. 338,231

4 Claims. (Cl. 260—429)

This invention relates to a new class of organic compounds which may be described as the amine addition products of zinc salts of dithiocarbamic acids. More particularly, the invention embraces the addition products of amines of aliphatic nature with such zinc salts of dithiocarbamic acids.

Heretofore, zinc salts of certain dithiocarbamic acids have enjoyed wide use as accelerators of the vulcanization of rubber. In the course of investigations to discover improved accelerators of this class, it has been found that addition products of amines, particularly of primary and secondary amines, may be formed with the zinc salts of dithiocarbamic acids, particularly the zinc salts of dialiphatic dithiocarbamic acids. These addition products are, in general, even more powerful accelerators than the zinc dithiocarbamates from which they are derived and are also relatively soluble in petroleum hydrocarbons and in rubber, this property making them particularly valuable in latex compounding.

The zinc dithiocarbamates with which amines may be reacted to give the compounds of the invention may be termed those in which the dithiocarbamate radical contains a secondary or a tertiary nitrogen group, the same resulting from the interaction of a primary or secondary amine and carbon bisulfide, in accordance with the equation

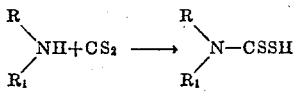

a metallic radical or the equivalent being present during the reaction to yield the acid in the form of its salt. R and $R_1$ may represent one organic radical and hydrogen or two individual organic radicals, such as two methyl radicals, or together they may represent one bivalent radical such as pentamethylene or oxy tetramethylene. Usually R and $R_1$ will be aliphatic in nature, including such representative groups as alkyl radicals, alicyclic radicals, aralkyl radicals and the like. The zinc salt of dimethyl dithiocarbamic acid is particularly productive of useful addition products with amines.

Other zinc salts which may be reacted with amines are those of cyclohexyl dithiocarbamic acid, tetrahydro furfuryl dithiocarbamic acid, benzyl dithiocarbamic acid, diethyl dithiocarbamic acid, dibutyl dithiocarbamic acid, diamyl dithiocarbamic acid, ethyl cyclohexyl dithiocarbamic acid, dibenzyl dithiocarbamic acid, ditetrahydro furfuryl dithiocarbamic acid, and pentamethylene dithiocarbamic acid.

Still others are the zinc dithiocarbamates derived from di-n-propyl amine, di isopropyl amine, N-methyl cyclohexyl amine, N-butyl cyclohexyl amine, N-methyl-o-methyl cyclohexyl amine, N-methyl tetrahydro alpha furfuryl amine, N-butyl tetrahydro alpha furfuryl amine, morpholine, sym. diethyl ethylene diamine, sym. dibutyl trimethylene diamine, N-ethyl-o-methyl cyclohexyl amine, pipecoline, methyl propyl amine, methyl isobutyl amine, 2-ethyl butyl amine and methyl ethyl amine.

The zinc salts of dithiocarbamic acids formed by combination of carbon bisulfide with the following amines may also be used to obtain addition products with additive amines; aliphatic secondary amines, alkyl piperidines, pyrrole, pyrroline, pyrrolidine, di-(2-ethyl butyl) amine, di-(2-ethyl hexyl) amine, alkyl amine, alicyclic betacyano-ethyl amine, dialkoxy propyl amine, and alkyl alkoxy amine.

It will be noted that the foregoing list includes zinc dithiocarbamic acids prepared from both primary and secondary amines, amine addition products being formed with both types of zinc dithiocarbamates.

The amine which is added to or combined with the zinc dithiocarbamate may be any of the organic amines available, but amines of aliphatic nature are preferred, particularly the alkyl amines, and cyclohexyl amine, piperidine and morpholine have been found to be particularly valuable in the formation of the addition products. Other amines which may be combined with zinc dithiocarbamates to form the compounds of the invention are as follows; primary butyl amine, primary amyl amine, hexadecyl amine, octadecyl amine, dimethyl amine, diethyl amine, dibutyl amine, diamyl amine, trimethyl amine, triamyl amine, ethylene diamine, hexadecyl propylene diamine, dibutyl ethylene diamine, diethylene triamine, and other poly amines, cyclohexyl amine, ethyl cyclohexyl amine, piperidine, furfuryl amine, tetrahydro furfuryl amine, ditetrahydro furfuryl amine, N-butyl tetrahydro furfuryl amine, benzyl amine, mono-o-tolyl ethylene diamine, and di(beta) phenethyl amine.

Other amines which can be combined in the same manner are dipropyl amine, hexahydro ortho or para toluidine, N-methyl cyclohexyl amine, N-methyl tetrahydro alpha furfuryl amine, N-ethyl tetrahydro alpha furfuryl amine, N-methyl hexahydro o-toluidine, pipecoline, sym. dimethyl ethylene diamine, sym. diethyl trimethylene diamine, sym. dipropyl ethylene diamine, beta phenethyl amine, di(beta phenethyl) amine, heptyl amine, N-methyl isobutyl amine, N-methyl ethyl amine, and N-methyl propyl amine.

To further illustrate the invention, the following examples are given of the preparation of certain addition products.

EXAMPLE 1

The addition product of cyclohexyl amine and zinc dimethyl dithiocarbamate is prepared by heating to the boiling point a mixture of 0.15 mols of zinc dimethyl dithiocarbamate, 0.495 mols of cyclohexylamine and 200 cc. of water. A colorless solid in an amount of 58.4 grams, which is 96% of the theoretical amount calculated for the compound formed by a mol per mol addition product of the amine and zinc dithiocarbamate was obtained. The product melted with decomposition starting at 169° C. Its nitrogen analysis also corresponded to that for the theoretical addition product of cyclohexyl amine with one mol of zinc dimethyl dithiocarbamate.

EXAMPLE 2

In another illustrative example a suspension of 45.8 grams of zinc dimethyl dithiocarbamate and 200 cc. of gasoline was stirred while 14.3 grams of mixed amyl primary amines, mostly iso amyl amine, were added to the suspension. The resulting solid material was filtered off and washed with gasoline, whereupon 55 grams of colorless solid were obtained. The colorless solid melted at 154° C. and is believed to be the addition product of one mol of amyl amine and one mol of zinc dimethyl dithiocarbamate. Water is also an excellent medium for the preparation of this complex.

EXAMPLE 3

In still another example illustrating the invention, 32.7 grams of cyclohexyl amine were added to 47.8 grams of zinc penta methylene dithiocarbamate in 175 cc. of gasoline, the gasoline mixture being stirred meanwhile. The reaction mixture was heated on a hot plate for a short period of time after which the mass was cooled, the solid filtered off and washed with gasoline. A colorless solid, a mol per mol addition product of cyclohexylamine and zinc penta methylene dithiocarbamate was obtained in an amount of 68.4 grams.

Other illustrative compounds of the invention are those given in the following table:

believed that such is the case. Also, the melting points or decomposition points, as they may be called, of many of the compounds have in general a fairly wide range. This is probably for the reason that many of the dithiocarbamates have a melting point above that of the additive amine compound and some decomposition takes place upon the heating incident to obtaining the melting point. It may be that after some of the heating, portions of the amine and zinc dithiocarbamate starting materials are present with the addition product. These melting points were conducted in the normal atmospheres.

Several melting points taken in a sealed tube also gave a rather wide range. In the sealed tube the compounds generally started to melt at a lower temperature, however. Illustrative melting points taken in a sealed tube are as follows:

Table II

| Compound | M. P. in °C. | |
|---|---|---|
| | Open tube | Closed tube |
| Addition product of— | | |
| Zinc dimethyl dithiocarcarbamate+ditetrahydro furfurylamine | 190-205 | 150-195 |
| Zinc dimethyl dithiocarbamate+cyclohexylamine | Starts at 169 | 179-195 |
| Zinc dimethyl dithiocarbamate+dimethylamine | 249-250 | 158-220 |
| Zinc dimethyl dithiocarbamate+benzylamine | 130-155 | 127-157 |
| Zinc ethyl cyclohexyl dithiocarbamate+piperidine | 80-102 | 80-100 |

Some of the melting points taken in the open air for the less stable addition products appear to approach the melting point for the zinc dithiocarbamate. For example, the addition product of dimethyl amine and zinc dimethyl dithiocarbamate melted at 249–250° C., which is the melting point of zinc dimethyl dithiocarbamate itself.

Table I

| | Zinc salt of dtcic acid derived from | Additive amines | Molecular proportions | Product | Melting or decomposition point in °C. |
|---|---|---|---|---|---|
| 1. | Dibutylamine | Piperidine | 1A; 1Z | Light tan solid | 65-70 |
| 2. | Do | Cyclohexylamine | 1A; 1Z | ___do___ | 74-75 |
| 3. | Do | Ethylene diamine | 1A; 1Z | Yellow paste | |
| 4. | Do | ___do___ | 3A; 1Z | Brown solid | |
| 5. | Do | Mixed amyl primary amines | 1A; 1Z | Brown semi-solid | |
| 6. | Dimethylamine | Cyclohexylamine | 1A; 1Z | Colorless solid | 169 |
| 7. | Do | Sym. dibutyl ethylene diamine | 1A; 1Z | Tan solid | 95-100 (Cloudy) |
| 8. | Do | Dimethylamine | | White solid | 249-250 (Cloudy) |
| 9. | Do | Dibutylamine | 1A; 1Z | ___do___ | 238-241 |
| 10. | Do | N-ethyl cyclohexylamine | 1A; 1Z | Lt. yellow solid | 163-170 |
| 11. | Do | Benzylamine | 1A; 1Z | Lt. cream solid | 130-155 |
| 12. | Do | Tetrahydro alpha furfurylamine | 1A; 1Z | Lt. yellow solid | 149-151 |
| 13. | Do | Ethylene diamine mono hydrate | 3A; 1Z | Colorless solid | 135 |
| 14. | Do | Mixed amyl primary amines | 1A; 1Z | ___do___ | 154 |
| 15. | Do | High boiling amines | | Yellow solid | 157-160 |
| 16. | Do | Piperidine | 1A; 1Z | Colorless solid | 128-133 |
| 17. | Do | Diethylamine | 1A; 1Z | ___do___ | 244-246 |
| 18. | Piperidine | Cyclohexylamine | 1A; 1Z | ___do___ | 110-144 |
| 19. | Do | Piperidine | 1A; 1Z | ___do___ | 145-147 |
| 20. | Dibenzylamine | ___do___ | 1A; 1Z | White solid | 147-149 |
| 21. | Do | Cyclohexylamine | 1A; 1Z | ___do___ | 155 |
| 22. | Do | Tetrahydro alpha furfurylamine | 1A; 1Z | Yellow crumbly solid | 90-95 |
| 23. | N-ethyl cyclohexylamine | Piperidine | 1A; 1Z | Lt. tan solid | 80-102 |
| 24. | Do | Cyclohexylamine | 1A; 1Z | ___do___ | 95-115 |
| 25. | Ditetrahydro a furfurylamine | Piperidine | 1A; 1Z | Lt. cream solid | 60-75 |
| 26. | Do | Cyclohexylamine | 1A; 1Z | Cream colored solid | 65-80 |
| 27. | Diamylamine | ___do___ | 1A; 1Z | Yellow brown liquid | |
| 28. | Do | Piperidine | 1A; 1Z | ___do___ | |

High boiling alkylene poly amines (No. 15) were obtained in the preparation of ethylene diamine, principally diethylene triamine and triethylene tetra amine.

In the third column, "A" refers to the additive amide and "Z" to the zinc dithiocarbamate.

While the molecular proportions have been given, these figures are not known definitely to be the true proportions of the amine and dithiocarbamate in the final products although it is In each case nitrogen analyses of the compounds were obtained and, where the nitrogen analysis of the product differed from that of the zinc dithiocarbamate, further proved a definite addition of the amine to the zinc dithiocarbamate. Typical analyses are as follows:

*Table III*

Zinc dimethyl dithiocarbamate.ethylene-diamine monohydrate

|  | Found | Theoretical values for C₆H₁₂N₂S₄Zn.3(C₂H₈N₂.H₂O) |
|---|---|---|
| Per cent N | 20.5, 20.4 | 20.8 |
| Per cent S | 23.0, 23.0 | 23.8 |
| Per cent Zn | 13.3, 13.3 | 12.1 |

Zinc dibutyl dithiocarbamate.ethylene diamine

|  | Found | Theoretical values for C₁₈H₃₆N₂S₄Zn.C₂H₈N₂ |
|---|---|---|
| Per cent N | 9.92, 9.77 | 10.5 |
| Per cent S | 23.8, 23.8 | 24.0 |

Zinc dibutyl dithiocarbamate.ethylene diamine

|  | Found | Theoretical values for C₁₈H₃₆N₂S₄Zn.3(C₂H₈N₂) |
|---|---|---|
| Per cent N | 16.8, 16.8 | 17.2 |
| Per cent S | 19.6, 19.6 | 19.6 |
| Per cent Zn | 10.4, 10.4 | 10.0 |

Zinc dibutyl dithiocarbamate.amyl amine

|  | Found | Theoretical values for C₁₈H₃₆N₂S₄Zn.C₅H₁₁N |
|---|---|---|
| Per cent N | 8.13, 8.08 | 7.50 |
| Per cent S | 21.2, 21.2 | 22.9 |
| Per cent Zn | 11.0, 10.9 | 11.7 |

Zinc dimethyl dithiocarbamate.cyclohexylamine

|  | Found | Theoretical values for C₆H₁₂N₂S₄Zn.C₆H₁₁N |
|---|---|---|
| Per cent N | 9.53, 9.46 | 10.4 |

Zinc dimethyl dithiocarabamate.dibutyl ethylene diamine

|  | Found | Theoretical values for C₆H₁₂N₂S₄Zn.C₁₀H₂₄N₂ |
|---|---|---|
| Per cent N | 11.1, 11.0 | 11.7 |

Zinc dimethyl dithiocarbamate.tetrahydrofurfurylamine

|  | Found | Theoretical values for C₆H₁₂N₂S₄Zn.C₅H₁₁ON |
|---|---|---|
| Per cent N | 10.3, 10.2 | 10.3 |

Zinc dibenzyl dithiocarbamate.piperidine

|  | Found | Theoretical values for C₃₀H₂₈N₂S₄Zn.C₅H₁₁N |
|---|---|---|
| Per cent N | 5.97, 5.97 | 6.05 |

This application is a continuation in part of my application Serial No. 44,766, filed October 12, 1935.

It will be understood that, while numerous examples have been given above, the invention is not limited thereto but includes generally the amine addition products of zinc dithiocarbamates. Hence, it will be understood that the invention is not limited to the compounds described but that various amines may be combined with zinc salts of various dithiocarbamic acids, without departing from the spirit of the invention or from the scope of the appended claims. Similarly, while various theories have been put forth herein, it will be understood that the invention is not to be limited thereby. It is intended, then, that the patent shall cover, by suitable expression in the appended claims, all features of patentable novelty residing in such invention.

What I claim is:

1. The addition products of a cyclohexylamine compound selected from the class consisting of cyclohexylamine, N-ethyl cyclohexylamine and N-methyl cyclohexylamine and a zinc salt of a dialkyl dithiocarbamate.

2. The additional products of cyclohexyl amine and a zinc salt of a dialkyl dithiocarbamic acid.

3. The addition product of cyclohexyl amine and zinc dimethyl dithiocarbamate.

4. The addition product of N-methyl cyclohexylamine and zinc dimethyl dithiocarbamate.

JOY G. LICHTY.

CORRECTION OF CORRECTION.

Patent No. 2,321,301. June 8, 1943.

JOY G. LICHTY.

It is hereby certified that error appears in the printed specification of the above numbered patent requiring correction as follows: Page 1, second column, line 13, for "alkyl amine" read --alkyl beta-cyanoethyl amine--; page 3, first column, line 42, Table III, for "dithiocarabamate" read --dithiocarbamate--; and second column, line 39, for "additional" read --addition--; and that the said Letters Patent should be read with this correction therein that the same may conform to the record of the case in the Patent Office.

Signed and sealed this 13th day of July, 1943.

(Seal)

Henry Van Arsdale,
Acting Commissioner of Patents.